US010617063B1

(12) United States Patent
Roberto

(10) Patent No.: US 10,617,063 B1
(45) Date of Patent: Apr. 14, 2020

(54) PLANT PROPAGATION APPARATUS AND METHODS OF USE

(71) Applicant: Electron Alchemy Inc., Massapequa Park, NY (US)

(72) Inventor: Keith Francis Roberto, Palm Coast, FL (US)

(73) Assignee: Electron Alchemy Inc., Massapequa Park, NY (US)

(*) Notice: Subject to any disclaimer, the term of this patent is extended or adjusted under 35 U.S.C. 154(b) by 0 days.

(21) Appl. No.: 16/520,275

(22) Filed: Jul. 23, 2019

(51) Int. Cl.
| A01G 2/10 | (2018.01) |
| A01G 29/00 | (2006.01) |
| A01G 31/02 | (2006.01) |
| A01G 24/20 | (2018.01) |
| A01G 3/00 | (2006.01) |
| A01G 24/40 | (2018.01) |
| A01G 5/00 | (2006.01) |

(52) U.S. Cl.
CPC .................. *A01G 2/10* (2018.02); *A01G 3/00* (2013.01); *A01G 5/00* (2013.01); *A01G 24/20* (2018.02); *A01G 24/40* (2018.02); *A01G 29/00* (2013.01); *A01G 31/02* (2013.01); *A01G 2003/007* (2013.01)

(58) Field of Classification Search
CPC . A01G 2/10; A01G 24/20; A01G 3/00; A01G 24/40; A01G 29/00; A01G 31/02; A01G 22/00; A01G 22/05; A01G 22/10; A01G 22/15; A01G 22/20; A01G 22/22; A01G 22/25; A01G 22/30; A01G 22/35; A01G 22/40; A01G 22/45; A01G 22/50; A01G 22/55; A01G 22/60; A01G 22/63; A01G 22/67; A01G 2003/023; A23N 15/02; A23N 15/00; A01H 4/00; A01H 4/001; A01H 4/003; A01H 4/008
See application file for complete search history.

(56) References Cited

U.S. PATENT DOCUMENTS

| 4,348,832 A * | 9/1982 | Hauser ..................... A01G 3/00 30/123.3 |
| 5,295,325 A * | 3/1994 | Honda ................... A01H 4/003 47/1.01 R |
| 5,659,996 A * | 8/1997 | Weder ...................... A01G 5/00 29/564.6 |
| 2010/0175355 A1* | 7/2010 | Desmarais ............. A01D 46/02 56/10.7 |

(Continued)

*Primary Examiner* — Joshua D Huson
(74) *Attorney, Agent, or Firm* — Entralta P.C.; Justin G. Sanders; Peter D. Weinstein

(57) ABSTRACT

A plant propagation apparatus and associated methods are disclosed for automating and optimizing the process of cutting, scraping and applying rooting hormone to plant stems. In at least one embodiment, a housing provides an at least one substantially tubular-shaped receiver sized and configured for removably receiving a plant stem therewithin. An at least one blade is positioned within the housing and configured for cutting the plant stem at a desired angle. An at least one pump outlet is positioned within the at least one receiver and configured for selectively administering a volume of rooting hormone to the plant stem. An at least one abrasive surface is positioned within the at least one receiver and configured for scraping an outer surface of the plant stem, as the plant stem is removed from the receiver.

19 Claims, 6 Drawing Sheets

(56) References Cited

U.S. PATENT DOCUMENTS

| | | | |
|---|---|---|---|
| 2015/0322443 A1* | 11/2015 | McCarty, II | B26D 5/06 |
| | | | 83/13 |
| 2017/0232627 A1* | 8/2017 | Raichart | B26D 1/147 |
| | | | 83/13 |
| 2019/0124852 A1* | 5/2019 | Mathurin | A01G 3/00 |

* cited by examiner

PLANT PROPAGATION APPARATUS AND METHODS OF USE

RELATED APPLICATIONS

Not applicable.

BACKGROUND

The subject of this patent application relates generally to plant propagation, and more particularly to a plant propagation apparatus and associated methods of use for automating and optimizing the process of cutting, scraping and applying rooting hormone to plant stems.

Applicant hereby incorporates herein by reference any and all patents and published patent applications cited or referred to in this application.

By way of background, plant cutting, also known as cloning, is a technique for asexually propagating plants in which a piece of a source plant, such as a stem of the source plant, (i.e., a cutting) is placed in a suitable medium such as moist soil, potting mix, coir or rock wool. The cutting produces new roots, leaves and/or stems, and thus becomes a new plant independent of the parent. Since most plant cuttings will have no root system of their own at first, they are likely to die from dehydration if the proper conditions are not met with respect to the medium in which they are placed. In addition, the cutting needs to be taken correctly. To help promote the formation of roots, a rooting hormone can be applied to the cut tip of the cutting. Traditionally, this process involves several manual steps. First, after a cutting is selected and cut from the source plant, the stem is gently scraped (or scored) approximately four inches from a base of the cutting. A razor blade or other sharp cutting device is sterilized (such as in alcohol or phytosan, for example) and then used to make a clean slice at a 45 degree angle at precisely the bottom of the scraped (or scored) stem. The cut tip is then dipped into a gel containing rooting hormone up to the top of the scraped (or scored) area—which must be done quickly in order to avoid an embolism from forming in the cut tip. The cutting is then inserted into an appropriate medium while the roots form that will enable the plant to establish itself for cultivation. This traditional process of manual propagation suffers from a number of potential problems. First, the multi-step manual process can become laborious and time consuming when propagating multiple cuttings in succession. The traditional process can also introduce opportunities for pathogens and contamination of the cuttings. Additionally, the variable results due to the human element could lead to imprecise cuttings and wasted rooting hormone. Thus, there remains a need for a solution that automates and optimizes the process of cutting, scraping and applying rooting hormone to plant stems.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a plant propagation apparatus and associated methods for automating and optimizing the process of cutting, scraping and applying rooting hormone to plant stems. In at least one embodiment, a housing provides an at least one substantially tubular-shaped receiver sized and configured for removably receiving a plant stem therewithin. An at least one blade is positioned within the housing and configured for cutting the plant stem at a desired angle when the plant stem is positioned within the at least one receiver. An at least one trigger is configured for selectively activating the at least one blade. An at least one pump outlet is positioned within the at least one receiver and configured for selectively administering a volume of rooting hormone to the plant stem when the plant stem is positioned within the receiver, the at least one pump outlet in fluid communication with each of an at least one pump and an at least one reservoir configured for storing a volume of rooting hormone. An at least one abrasive surface is positioned within the at least one receiver and configured for scraping or scoring an outer surface of the plant stem within the receiver, as the plant stem is removed from the receiver.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
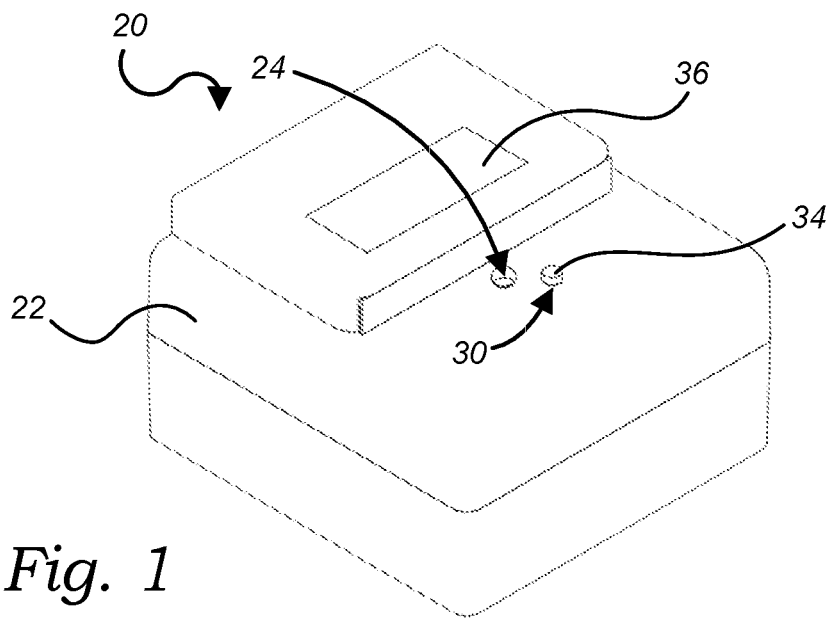
FIG. 1 is a perspective view of an exemplary plant propagation apparatus, in accordance with at least one embodiment.
Figure 4:
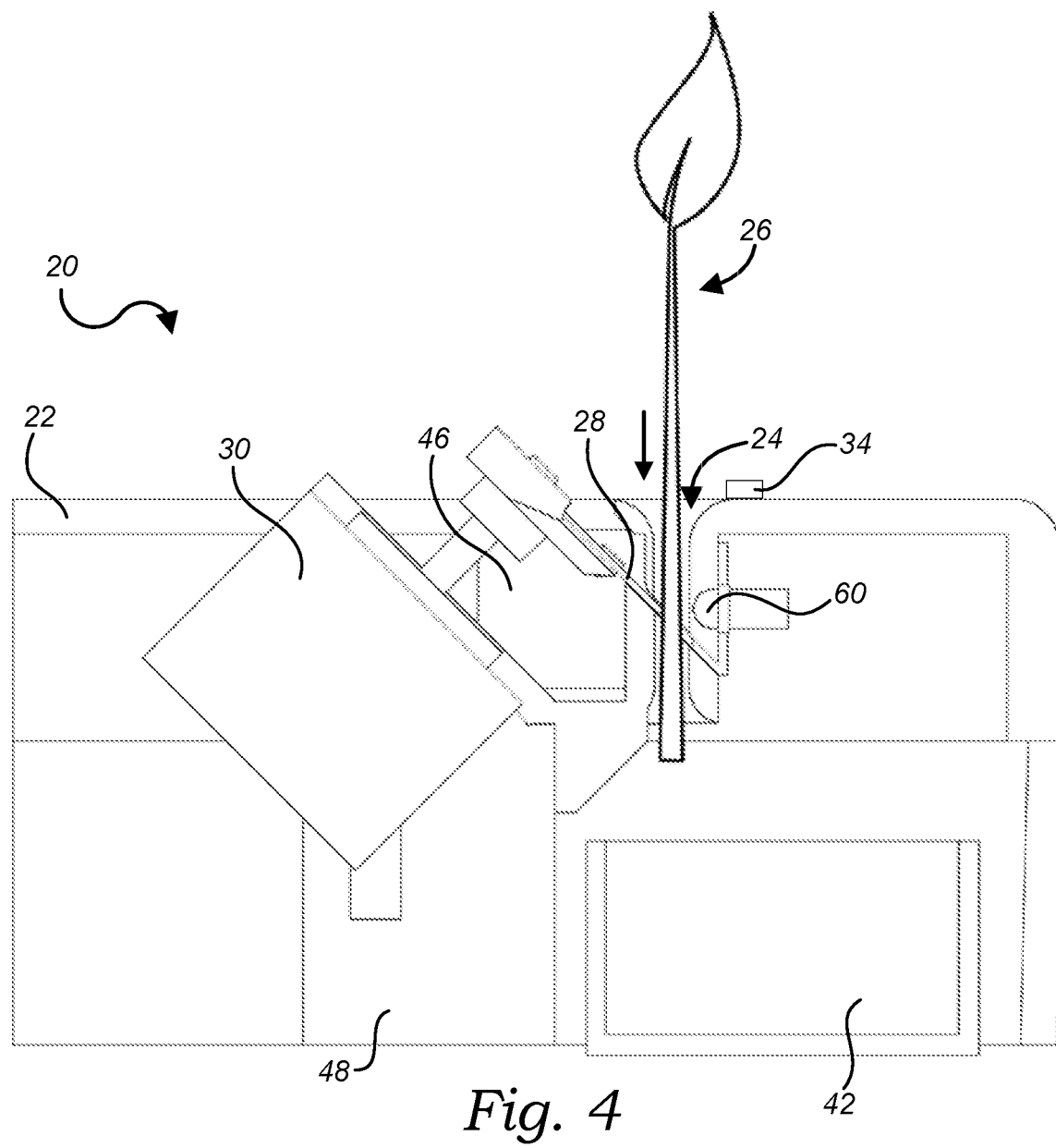
FIGS. 4-7 are further side elevational views thereof, with a portion of the housing again omitted for illustrative purposes, illustration an exemplary sequence of cutting, scraping and dipping an exemplary plant stem, in accordance with at least one embodiment.

Turning now to FIG. 1, there is shown a perspective view of an exemplary plant propagation apparatus 20 for automating and optimizing the process of cutting, scraping and applying rooting hormone to plant stems, in accordance with at least one embodiment. In that regard, it should be noted that, for simplicity purposes, the term scraping as used herein is also intended to include scoring and any other methods by which portions of an outer surface of the plant stem is removed or otherwise penetrated so as to allow the rooting hormone to pass through the outer surface of the plant stem. In at least one embodiment, the apparatus 20 provides a housing 22 which, in turn, provides an at least one substantially tubular-shaped receiver 24 sized and configured for removably receiving a plant stem 26 therewithin (FIG. 4). In that regard, it should be noted that the size, shape and dimensions of the housing 22 as depicted in the drawings (and as described herein) is merely exemplary; thus, in further embodiments, the housing 22 may take on any other size, shape and/or dimensions, now known or later developed, so long as the apparatus 20 is capable of substantially carrying out the functionality described herein. Similarly, the size, shape, dimensions, quantity and position of the at least one receiver 24 relative to the housing 22 as depicted in the drawings is merely exemplary, such that in further embodiments, the at least one receiver 24 may take on any other size, shape, dimensions and/or quantity, now known or later developed, and may be positioned and/or arranged elsewhere on the housing 22, so long as the apparatus 20 is capable of substantially carrying out the functionality described herein. In at least one further embodiment (not shown), the apparatus 20 provides an at least one substantially tubular-shaped stem adapter sized and configured for being removably inserted into the receiver 24 in order to reduce a diameter of the receiver 24, thereby providing a better fit for relatively smaller plant stems 26.

Figure 2:
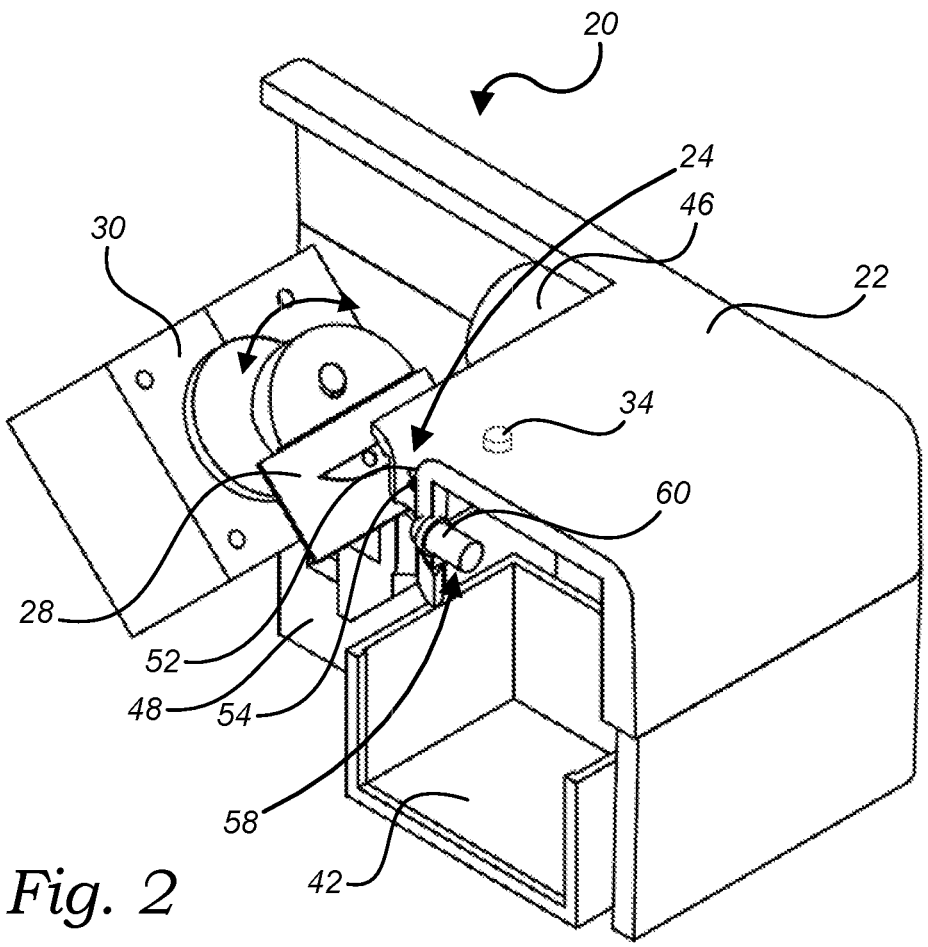
FIG. 2 is a further perspective view thereof, with a portion of a housing of the apparatus omitted for illustrative purposes, in accordance with at least one embodiment.
Figure 3:
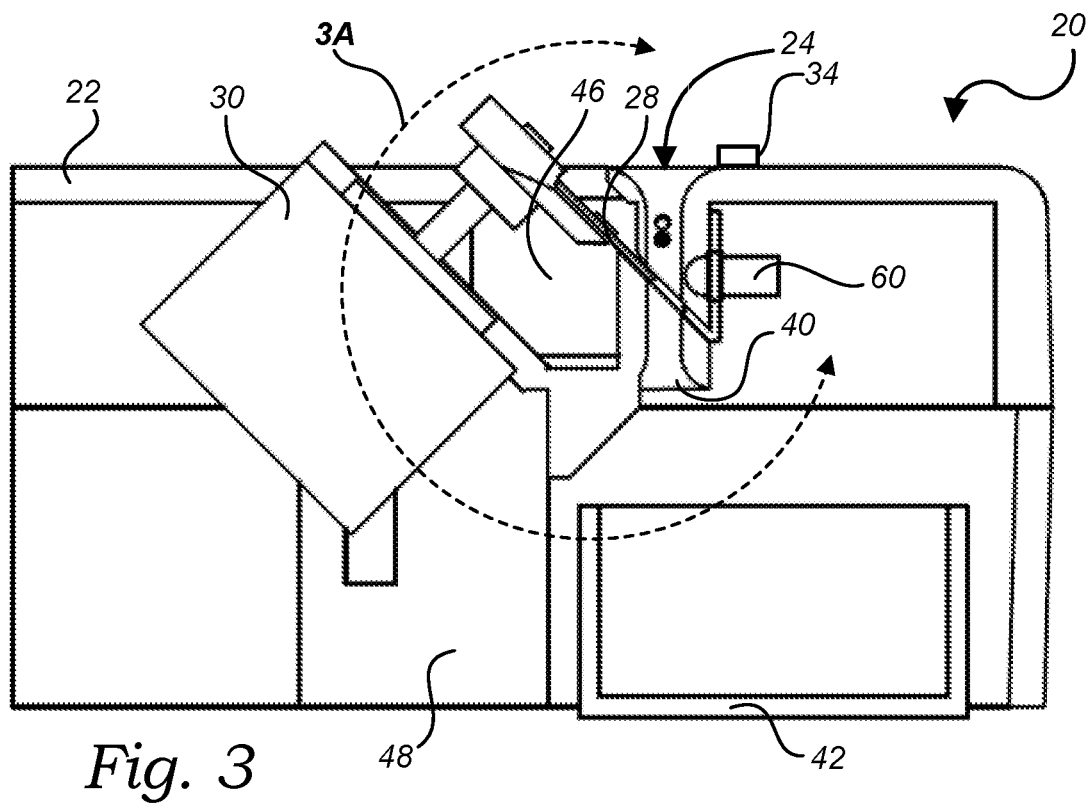
FIG. 3 is a side elevational view thereof, with a portion of the housing again omitted for illustrative purposes, in accordance with at least one embodiment.
Figure 3A:
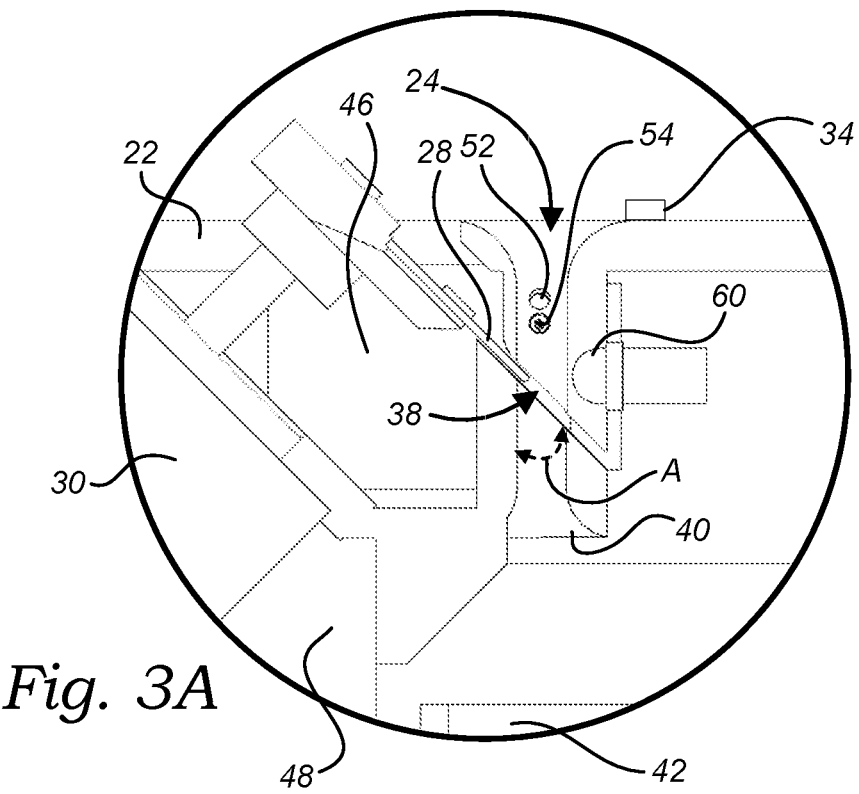
FIG. 3A is a detailed view of the section defined by line 3A of FIG. 3.

In at least one embodiment, as illustrated best in FIG. 2, the apparatus 20 provides an at least one blade 28 positioned and configured for cutting the plant stem 26 when it is positioned within the receiver 24, as discussed further below. Additionally, as illustrated in FIGS. 3 and 3A, the blade 28 is positioned relative to the receiver 24 so that the blade 28 will cut the plant stem 26 at a desired angle A. In at least one embodiment, the desired angle A is 45 degrees; however, in further embodiments, the desired angle A may be any other angle between zero and 360 degrees. In at least one embodiment, the angle A is fixed between the blade 28 and the receiver 24; however, in at least one further embodiment, the angle A is selectively adjustable. In at least one embodiment, the blade 28 is a rotary cutting mechanism configured for selectively rotating along an arcuate path (FIG. 2). In at least one such embodiment, the blade 28 is configured for rotating in a single direction—i.e., either clockwise or counterclockwise. In at least one alternate embodiment, the blade 28 is configured for rotating in alternating directions, thereby utilizing both left and right sides of the blade 28 equally in order to increase the number of uses before needing to replace or sharpen the blade 28. In at least one embodiment, the blade 28 is driven by a servo motor 30. In at least one alternate embodiment, the blade 28 is a reciprocating cutting mechanism. In still further embodiments, any other type of blade or cutting device, now known or later developed, may be substituted, so long as the apparatus 20 is capable of substantially carrying out the functionality described herein.

In at least one embodiment, the blade 28 is selectively activated by a trigger 32. In at least one embodiment, the trigger 32 is a manually activated mechanism, such as a button 34 positioned on the housing 22 or a foot switch, for example. In at least one alternate embodiment, the trigger 32 is an automatically activated mechanism, such as an optical sensor positioned within the receiver 24 for detecting the presence of a plant stem 26. In still further embodiments, the trigger 32 may be any other mechanism (or combination of mechanisms), now known or later developed, capable of selectively activating the blade 28 as discussed herein.

In at least one embodiment, the apparatus 20 further provides a microprocessor (not shown) positioned within the housing 22 and configured for tracking the number of times the blade 28 is used which, in turn, allows the microprocessor to determine when the blade 28 needs to be sharpened or replaced. Upon determining that the blade 28 needs to be sharpened or replaced, the microprocessor is configured for transmitting an appropriate notification to a user of the apparatus 20, with such notifications being provided via a display screen 26 on the housing 22 (FIG. 1), or via an external computing or electronic device in communication with the microprocessor—such as a desktop computer, mobile phone, smartphone, laptop computer, tablet computer, personal data assistant, gaming device, wearable device, etc.

In at least one embodiment, as best illustrated in FIG. 3A, the receiver 24 defines a blade slot 38 positioned therewithin, with the blade slot 38 configured for allowing the blade 28 to pass therethrough in order to cut the plant stem 26 positioned within the receiver 24. In at least one such embodiment, the blade slot 38 is positioned relative to the receiver 24 at the same desired angle A as the blade 28. In at least one alternate embodiment (not shown), rather than the receiver 24 defining a blade slot 38, the blade 28 is instead positioned and configured for passing under a terminal end 40 of the receiver 24 in order to cut a portion of the plant stem 26 protruding beyond the terminal end 40 of the receiver 24.

Figure 5:
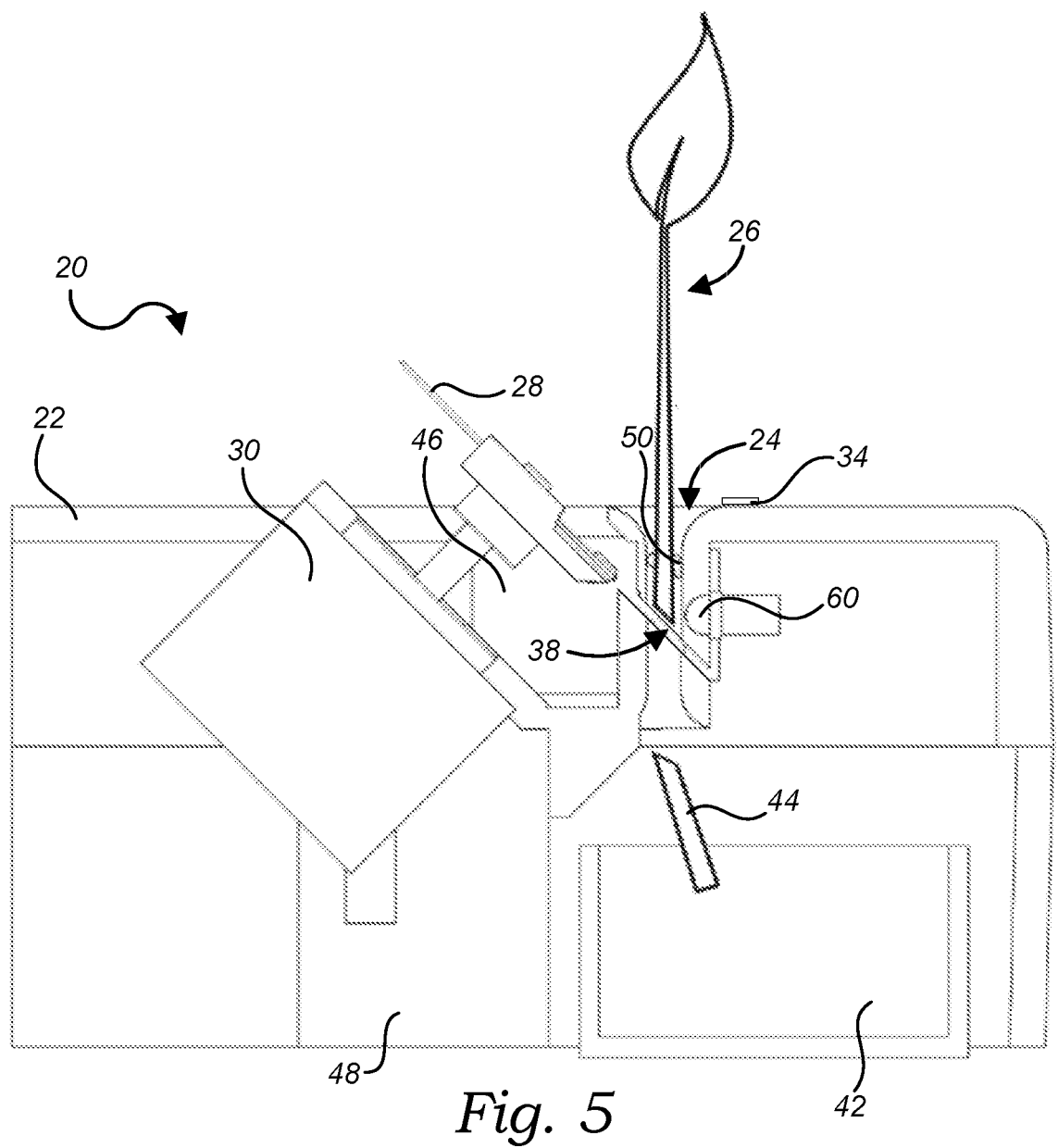
Figure 6:
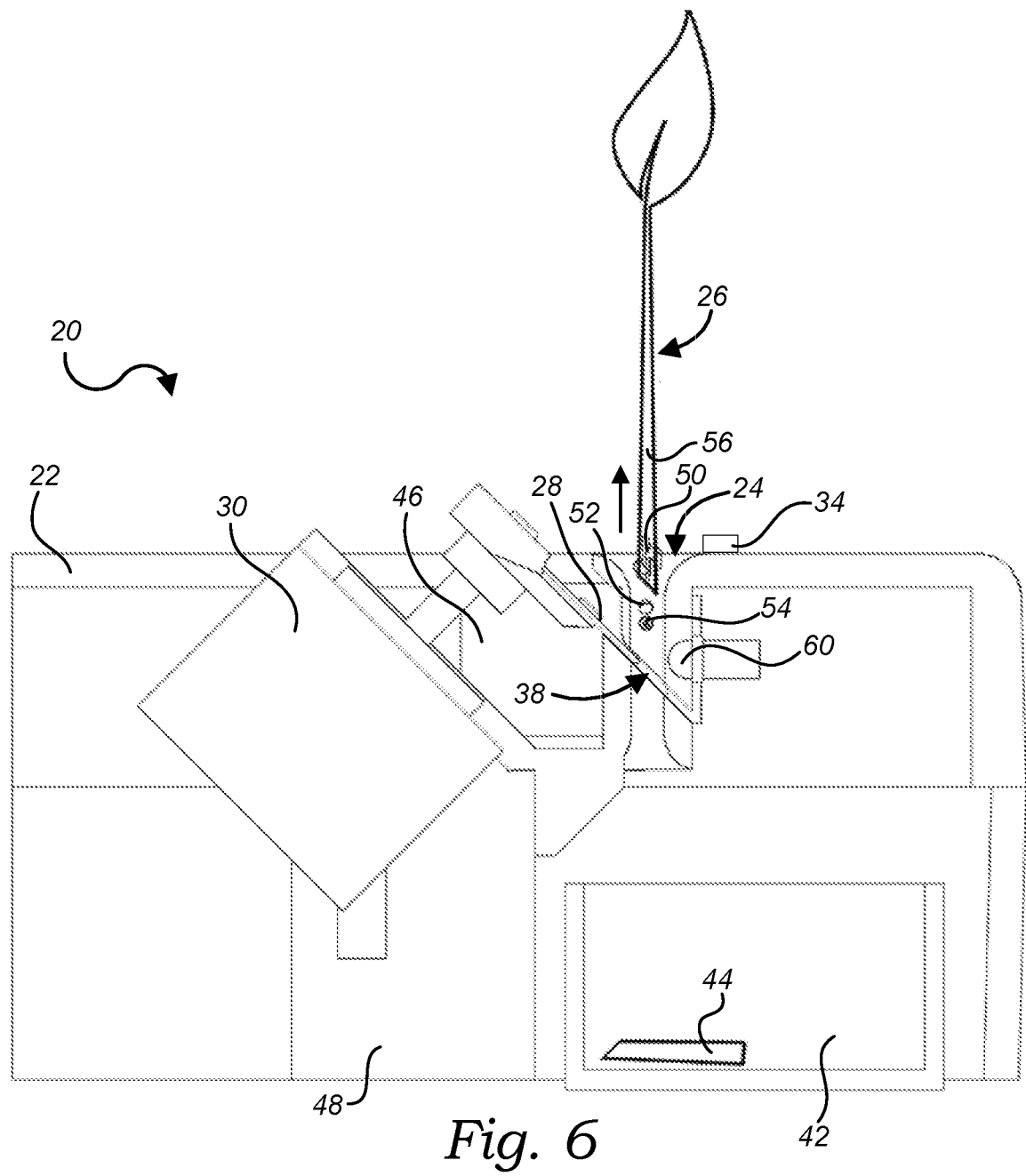

In at least one embodiment, as best illustrated in FIGS. 5 and 6, the apparatus 20 further provides an at least one scrap receptacle 42 positioned and configured for receiving the portion of the plant stem 26 that is severed by the blade 28 (hereinafter referred to as a scrap 44). In at least one such embodiment, the scrap receptacle 42 is removably positioned within the housing 22. In at least one further such embodiment, the scrap receptacle 42 is permanently positioned within the housing 22, with the housing 22 providing an access door positioned and configured for allowing the scrap receptacle 42 to be accessed and selectively emptied. In at least one still further embodiment, the scrap receptacle 42 is positioned external to the housing 22. It should also be noted that the size, shape, dimensions, quantity and relative position of the at least one scrap receptacle 42 as depicted in the drawings (and as described herein) is merely exemplary; thus, in further embodiments, the at least one scrap receptacle 42 may take on any other size, shape, dimensions and/or quantity, now known or later developed, and may be positioned and/or arranged elsewhere on or within the housing 22, so long as the apparatus 20 is capable of substantially carrying out the functionality described herein.

In at least one embodiment, as best illustrated in FIG. 3, the apparatus 20 further provides an at least one pump 46 positioned within the housing 22 along with an at least one reservoir 48 in fluid communication with the at least one pump 46. The at least one reservoir 48 is configured for storing a volume of rooting hormone 50 in the form of either a fluid or a gel. In at least one alternate embodiment, one or both of the at least one pump 46 and the at least one reservoir 48 are positioned external to the housing. In at least one such alternate embodiment, the at least one reservoir 48 is the commercial packaging in which the rooting hormone 50 is packaged and sold. Additionally, in at least one embodiment, the receiver 24 provides an at least one pump outlet 52 in fluid communication with the at least one reservoir 48, via the at least one pump 46, with the at least one pump outlet 52 being positioned and configured for administering a volume of the rooting hormone 50 to the plant stem 26 within the receiver 24, as discussed further below. In at least one embodiment, the at least one pump outlet 52 is positioned substantially above the blade slot 38, thereby allowing the rooting hormone 50 to be selectively administered to the plant stem 26 just above the fresh cut made by the blade 28. In at least one embodiment, the at least one pump 46 is a peristaltic pump. However, in further embodiments, any other type of pump (now known or later developed) may be substituted, so long as the apparatus 20 is capable of substantially carrying out the functionality described herein. It should also be noted that the size, shape, dimensions, quantities and relative positions of each of the at least one pump 46, reservoir 48 and pump outlet 52 as depicted in the drawings (and as described herein) is merely exemplary; thus, in further embodiments, each of the at least one pump 46, reservoir 48 and pump outlet 52 may take on any other size, shape, dimensions and/or quantities, now known or later developed, and may be positioned and/or arranged elsewhere on or within the housing 22, so long as the apparatus 20 is capable of substantially carrying out the functionality described herein.

In at least one embodiment, as best illustrated in FIG. 3A, the receiver 24 further provides an at least one abrasive surface 54 positioned and configured for scraping an outer surface 56 of the plant stem 26 within the receiver 24, as the plant stem 26 is removed from the receiver 24 (after being cut by the blade 28), as discussed further below. In at least one embodiment, the at least one abrasive surface 54 is positioned substantially between the at least one pump outlet 52 and the blade slot 38, thereby allowing the abrasive surface 54 to scrape the plant stem 26 so as to increase the penetration of the rooting hormone 50, while also spreading the rooting hormone 50 as the plant stem 26 is subsequently removed from the receiver 24. In at least one embodiment, the at least one abrasive surface 54 is positioned on a spring-loaded plunger positioned within the receiver 24 and configured for selectively extending a distance into the receiver 24. In at least one alternate embodiment, the at least one abrasive surface 54 is rigidly positioned within the receiver 24. It should also be noted that the size, shape, dimensions, quantity and relative position of the at least one abrasive surface 54 as depicted in the drawings (and as described herein) is merely exemplary; thus, in further embodiments, the at least one abrasive surface 54 may take on any other size, shape, dimensions and/or quantity, now known or later developed, and may be positioned and/or arranged elsewhere on or within the housing 22 or receiver 24, so long as the apparatus 20 is capable of substantially carrying out the functionality described herein. For example, in at least one further embodiment, the at least one abrasive surface 54 provides one or more scoring blades.

Figure 7:
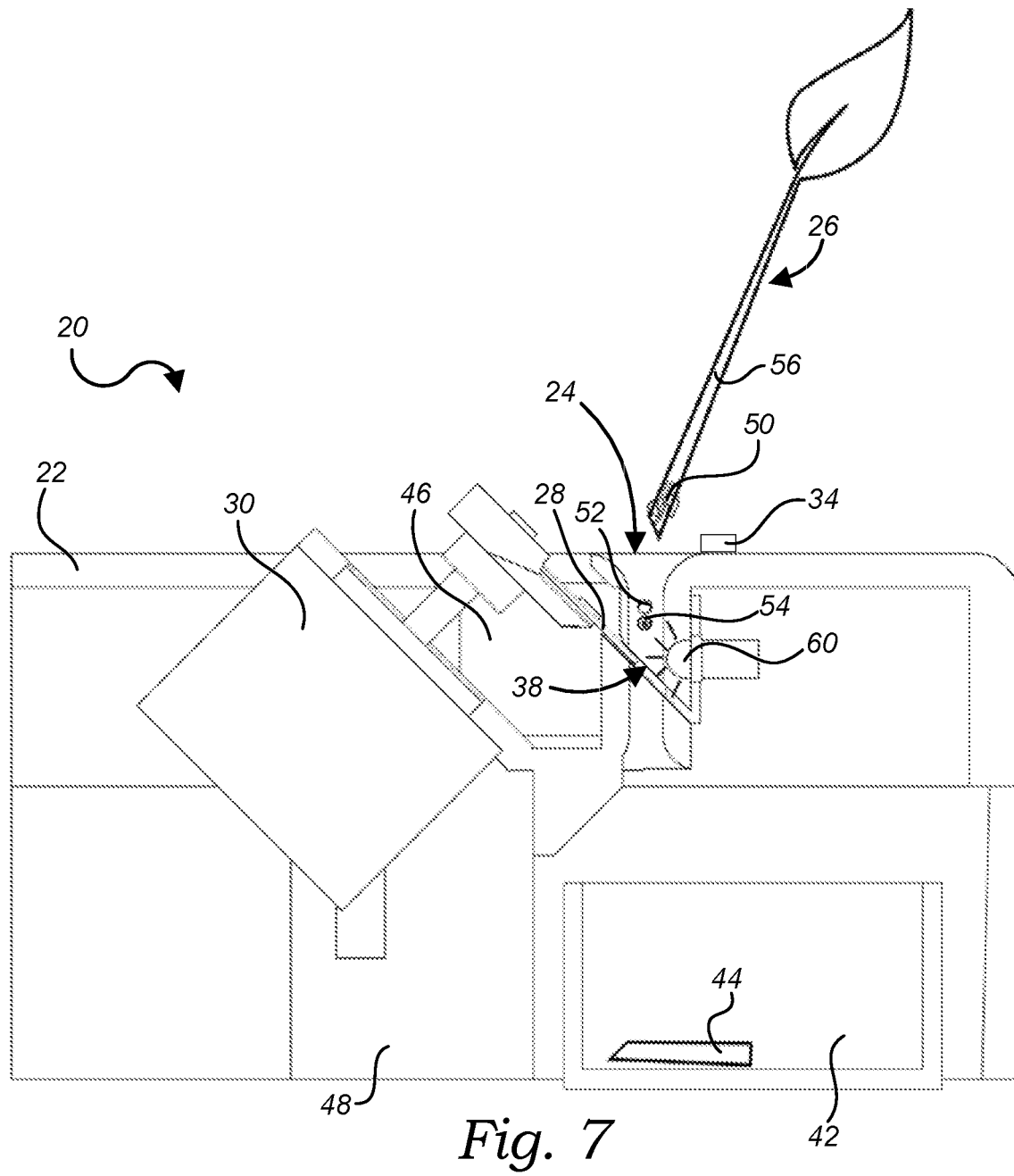

In at least one embodiment, the apparatus 20 further provides an at least one sterilizer 58 positioned within the housing 22 and configured for sterilizing the blade 28 during use of the apparatus 20. In at least one such embodiment, the at least one sterilizer 58 is an ultraviolet light 60. In at least one embodiment, the light 60 is configured for selectively turning on immediately after the blade 28 has cut the plant stem 26 (FIG. 7), then subsequently turning off again. In at least one alternative embodiment, the light 60 is configured for staying on during use of the apparatus 20 so as to provide real-time sterilization of the blade 28 between cuts. It should also be noted that the size, shape, dimensions, quantity and relative position of the at least one sterilizer 58 as depicted in the drawings (and as described herein) is merely exemplary; thus, in further embodiments, the at least one sterilizer 58 may take on any other size, shape, dimensions and/or quantity, now known or later developed, and may be positioned and/or arranged elsewhere on or within the housing 22 or receiver 24, so long as the apparatus 20 is capable of substantially carrying out the functionality described herein. In at least one alternate embodiment (not shown), the at least one sterilizer 58 is positioned and configured for administering a sterilization fluid on the blade 28. In still further embodiments, the at least one sterilizer 58 may be any other mechanism (or combination of mechanisms), now known or later developed, capable of selectively sterilizing the blade 28 as discussed herein.

In at least one embodiment, the apparatus 20 provides an at least one battery (not shown) positioned within the housing 22 and configured for selectively powering the various components of the apparatus 20 described herein. In at least one further embodiment, the apparatus 20 may provide other types of power sources, now known or later developed—either in addition to or in lieu of the at least one battery—so long as the apparatus 20 is capable of substantially carrying out the functionality described herein.

In at least one embodiment, the apparatus 20 is also configured for having network management capabilities and integration with production planning and tracking software.

Use of the apparatus 20, in at least one embodiment, is illustrated in FIGS. 4-7. In a bit more detail, the plant stem 26 is first inserted into the receiver 24 (FIG. 4)—either manually by hand or automatically via a machine—at which point the blade 28 is activated via the trigger 32 so as to precisely cut the plant stem 26 at the desired angle A, with the severed scrap 44 falling into the scrap receptacle 42 below (FIG. 5). Contemporaneously with the blade 28 cutting the plant stem 26, a metered volume of rooting hormone 50 is administered to the plant stem 26 via the at least one pump outlet 52, just above the fresh cut made by the blade 28 (FIG. 5). As the plant stem 26 is subsequently removed from the receiver 24, the plant stem 26 is drawn against the at least one abrasive surface 54 (FIG. 6), thereby scraping the plant stem 26 so as to increase the penetration of the rooting hormone 50, while also spreading the rooting hormone 50. Additionally, the at least one sterilizer 58 sterilizes the blade 28 (FIG. 7) to prepare it for cutting a further plant stem 26. Thus, in at least one such embodiment, the apparatus 20 is capable of automating and optimizing the process of cutting, scraping and applying rooting hormone to plant stems 26 in a single action, thereby increasing the speed and accuracy with which plant stems 26 can be propagated.

Aspects of the present specification may also be described as the following embodiments:

1. A plant propagation apparatus comprising: a housing providing an at least one substantially tubular-shaped receiver sized and configured for removably receiving a plant stem therewithin; an at least one blade positioned within the housing and configured for cutting the plant stem at a desired angle when the plant stem is positioned within the at least one receiver; an at least one trigger configured for selectively activating the at least one blade; an at least one pump outlet positioned within the at least one receiver and configured for selectively administering a volume of rooting hormone to the plant stem when the plant stem is positioned within said receiver, the at least one pump outlet in fluid communication with each of an at least one pump and an at least one reservoir configured for storing a volume of rooting hormone; and an at least one abrasive surface positioned within the at least one receiver and configured for scraping an outer surface of the plant stem within said receiver, as the plant stem is removed from said receiver.

2. The plant propagation apparatus according to embodiment 1, further comprising an at least one substantially tubular-shaped stem adapter sized and configured for being removably inserted into the at least one receiver in order to reduce a diameter of said receiver.

3. The plant propagation apparatus according to embodiments 1-2, wherein the desired angle is approximately 45 degrees.

4. The plant propagation apparatus according to embodiments 1-3, wherein the desired angle is fixed.

5. The plant propagation apparatus according to embodiments 1-4, wherein the desired angle is selectively adjustable.

6. The plant propagation apparatus according to embodiments 1-5, wherein the at least one blade is a rotary cutting mechanism configured for selectively rotating along an arcuate path.

7. The plant propagation apparatus according to embodiments 1-6, wherein the at least one blade is configured for rotating in a single direction.

8. The plant propagation apparatus according to embodiments 1-7, wherein the at least one blade is configured for rotating in alternating directions.

9. The plant propagation apparatus according to embodiments 1-8, wherein the at least one blade is driven by a servo motor.

10. The plant propagation apparatus according to embodiments 1-9, wherein the at least one blade is a reciprocating cutting mechanism.

11. The plant propagation apparatus according to embodiments 1-10, wherein the at least one trigger is at least one of a button positioned on the housing, a foot switch, and an optical sensor positioned within the at least one receiver for detecting the presence of the plant stem.

12. The plant propagation apparatus according to embodiments 1-11, wherein the at least one receiver defines a blade slot positioned therewithin, the blade slot configured for allowing the at least one blade to pass therethrough in order to cut the plant stem positioned within said receiver.

13. The plant propagation apparatus according to embodiments 1-12, wherein the blade slot is positioned relative to the receiver at the desired angle.

14. The plant propagation apparatus according to embodiments 1-13, wherein the at least one pump outlet is positioned substantially above the blade slot.

15. The plant propagation apparatus according to embodiments 1-14, wherein the at least one abrasive surface is positioned substantially between the at least one pump outlet and the blade slot.

16. The plant propagation apparatus according to embodiments 1-15, wherein the at least one blade is positioned and configured for passing under a terminal end of the at least one receiver in order to cut a portion of the plant stem protruding beyond the terminal end of said receiver.

17. The plant propagation apparatus according to embodiments 1-16, further comprising an at least one scrap receptacle positioned and configured for receiving a portion of the plant stem that is severed by the at least one blade.

18. The plant propagation apparatus according to embodiments 1-17, wherein the at least one scrap receptacle is removably positioned within the housing.

19. The plant propagation apparatus according to embodiments 1-18, wherein the at least one pump is a peristaltic pump.

20. The plant propagation apparatus according to embodiments 1-19, wherein the at least one pump and reservoir are positioned within the housing.

21. The plant propagation apparatus according to embodiments 1-20, wherein the at least one abrasive surface is positioned on a spring-loaded plunger positioned within the receiver and configured for selectively extending a distance into the receiver.

22. The plant propagation apparatus according to embodiments 1-21, wherein the at least one abrasive surface is rigidly positioned within the receiver.

23. The plant propagation apparatus according to embodiments 1-22, further comprising an at least one sterilizer positioned within the housing and configured for sterilizing the at least one blade during use of the apparatus.

24. The plant propagation apparatus according to embodiments 1-23, wherein the at least one sterilizer is an ultraviolet light.

25. The plant propagation apparatus according to embodiments 1-24, wherein the light is configured for selectively turning on immediately after the blade has cut the plant stem within the at least one receiver.

26. The plant propagation apparatus according to embodiments 1-25, further comprising an at least one battery positioned within the housing and configured for selectively powering the apparatus.

27. The plant propagation apparatus according to embodiments 1-26, further comprising: a microprocessor positioned within the housing and configured for tracking blade usage; whereby, upon the microprocessor determining that the at least one blade needs to be sharpened or replaced, the microprocessor is configured for transmitting an appropriate notification to a user of the apparatus.

28. A plant propagation apparatus comprising: a housing providing an at least one substantially tubular-shaped receiver sized and configured for removably receiving a plant stem therewithin; an at least one blade positioned within the housing and configured for cutting the plant stem at a desired angle when the plant stem is positioned within the at least one receiver; the at least one receiver defining a blade slot positioned therewithin, the blade slot configured for allowing the at least one blade to pass therethrough in order to cut the plant stem positioned within said receiver; an at least one trigger configured for selectively activating the at least one blade; an at least one pump outlet positioned within the at least one receiver, substantially above the blade slot, and configured for selectively administering a volume of rooting hormone to the plant stem when the plant stem is positioned within said receiver, the at least one pump outlet in fluid communication with each of an at least one pump and an at least one reservoir configured for storing a volume of rooting hormone; and an at least one abrasive surface positioned within the at least one receiver, substantially between the at least one pump outlet and the blade slot, and configured for scraping an outer surface of the plant stem within said receiver, as the plant stem is removed from said receiver.

29. A method for cutting a plant stem utilizing the plant propagation apparatus according to embodiments 1-27, the method comprising the steps of: inserting a plant stem into the at least one receiver; activating the at least one blade via the trigger so as to precisely cut the plant stem at the desired angle; administering a metered volume of rooting hormone to the plant stem via the at least one pump outlet; and removing the plant stem from said receiver, thereby drawing the plant stem against the at least one abrasive surface so as to scrape an outer surface of the plant stem and spread the rooting hormone thereon.

30. The method according to embodiment 29, further comprising the step of sterilizing the at least one blade via an at least one sterilizer positioned within the housing.

In closing, regarding the exemplary embodiments of the present invention as shown and described herein, it will be appreciated that a plant propagation apparatus and associated methods are disclosed for automating and optimizing the process of cutting, scraping and applying rooting hormone to plant stems. Because the principles of the invention may be practiced in a number of configurations beyond those shown and described, it is to be understood that the invention is not in any way limited by the exemplary embodiments, but is generally directed to a plant propagation apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to Applicant and does not constitute any admission as to the correctness of the dates or contents of these documents.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A plant propagation apparatus comprising:
    a housing providing an at least one substantially tubular-shaped receiver sized and configured for removably receiving a plant stem therewithin;
    an at least one blade positioned within the housing and configured for cutting the plant stem at a desired angle when the plant stem is positioned within the at least one receiver;
    an at least one trigger configured for selectively activating the at least one blade;
    an at least one pump outlet positioned within the at least one receiver and configured for selectively administering a volume of rooting hormone to the plant stem when the plant stem is positioned within said receiver, the at least one pump outlet in fluid communication with each of an at least one pump and an at least one reservoir configured for storing a volume of rooting hormone; and
    an at least one abrasive surface positioned within the at least one receiver such that each of the at least one abrasive surface, pump outlet and blade are positioned along a substantially linear path on which the plant stem travels within said receiver, as said plant stem is inserted into said receiver and subsequently removed therefrom after being cut by the at least one blade, the at least one abrasive surface configured for scraping an outer surface of the plant stem within said receiver as the plant stem is removed from said receiver.

2. The plant propagation apparatus of claim 1, wherein the desired angle is approximately 45 degrees.

3. The plant propagation apparatus of claim 1, wherein the at least one blade is a rotary cutting mechanism configured for selectively rotating along an arcuate path.

4. The plant propagation apparatus of claim 3, wherein the at least one blade is configured for rotating in alternating directions.

5. The plant propagation apparatus of claim 1, wherein the at least one trigger is at least one of a button positioned on the housing, a foot switch, and an optical sensor positioned within the at least one receiver for detecting the presence of the plant stem.

6. The plant propagation apparatus of claim 1, wherein the at least one receiver defines a blade slot positioned therewithin, the blade slot configured for allowing the at least one blade to pass therethrough in order to cut the plant stem positioned within said receiver.

7. The plant propagation apparatus of claim 6, wherein the blade slot is positioned relative to the receiver at the desired angle.

8. The plant propagation apparatus of claim 6, wherein the at least one pump outlet is positioned substantially above the blade slot.

9. The plant propagation apparatus of claim 8, wherein the at least one abrasive surface is positioned substantially between the at least one pump outlet and the blade slot.

10. The plant propagation apparatus of claim 1, further comprising an at least one scrap receptacle positioned and configured for receiving a portion of the plant stem that is severed by the at least one blade.

11. The plant propagation apparatus of claim 10, wherein the at least one scrap receptacle is removably positioned within the housing.

12. The plant propagation apparatus of claim 1, wherein the at least one pump and reservoir are positioned within the housing.

13. The plant propagation apparatus of claim 1, wherein the at least one abrasive surface is positioned on a spring-loaded plunger positioned within the receiver and configured for selectively extending a distance into the receiver toward the stem, such that the at least one abrasive surface is biased against the outer surface of the plant stem as the plant stem is removed from said receiver.

14. The plant propagation apparatus of claim 1, further comprising an at least one sterilizer positioned within the housing and configured for sterilizing the at least one blade during use of the apparatus.

15. The plant propagation apparatus of claim 14, wherein the at least one sterilizer is an ultraviolet light.

16. The plant propagation apparatus of claim 15, wherein the light is configured for selectively turning on immediately after the blade has cut the plant stem within the at least one receiver.

17. The plant propagation apparatus of claim 1, further comprising:
   a microprocessor positioned within the housing and configured for tracking blade usage;
   whereby, upon the microprocessor determining that the at least one blade needs to be sharpened or replaced, the microprocessor is configured for transmitting an appropriate notification to a user of the apparatus.

18. A plant propagation apparatus comprising:
   a housing providing an at least one substantially tubular-shaped receiver sized and configured for removably receiving a plant stem therewithin;
   an at least one blade positioned within the housing and configured for cutting the plant stem at a desired angle when the plant stem is positioned within the at least one receiver;
   the at least one receiver defining a blade slot positioned therewithin, the blade slot configured for allowing the at least one blade to pass therethrough in order to cut the plant stem positioned within said receiver;
   an at least one trigger configured for selectively activating the at least one blade;
   an at least one pump outlet positioned within the at least one receiver, substantially above the blade slot, and configured for selectively administering a volume of rooting hormone to the plant stem when the plant stem is positioned within said receiver, the at least one pump outlet in fluid communication with each of an at least one pump and an at least one reservoir configured for storing a volume of rooting hormone; and
   an at least one abrasive surface positioned within the at least one receiver, substantially between the at least one pump outlet and the blade slot such that the at least one abrasive surface and pump outlet are substantially linearly aligned with one another within said receiver, the at least one abrasive surface configured for scraping an outer surface of the plant stem within said receiver as the plant stem is removed from said receiver.

19. A method for cutting a plant stem utilizing the plant propagation apparatus of claim 1, the method comprising the steps of:
   inserting a plant stem into the at least one receiver;
   activating the at least one blade via the trigger so as to precisely cut the plant stem at the desired angle;
   administering a metered volume of rooting hormone to the plant stem via the at least one pump outlet; and
   removing the plant stem from said receiver, thereby drawing the plant stem against the at least one abrasive surface so as to scrape an outer surface of the plant stem in order to increase penetration of the rooting hormone into the plant stem while spreading the rooting hormone thereon.

\* \* \* \* \*